(12) United States Patent
Hong et al.

(10) Patent No.: US 10,563,688 B2
(45) Date of Patent: Feb. 18, 2020

(54) NUT RUNNER (71) Applicants: Hyundai Motor Company, Seoul (KR); Kia Motors Corporation, Seoul (KR)

(72) Inventors: Jin Young Hong, Yongin-si (KR); Jung Whan Yeum, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 185 days.

(21) Appl. No.: 15/814,211

(22) Filed: Nov. 15, 2017

(65) Prior Publication Data
US 2018/0340566 A1 Nov. 29, 2018

(30) Foreign Application Priority Data

May 25, 2017 (KR) .................. 10-2017-0064861

(51) Int. Cl.
| *F16B 39/10* | (2006.01) |
| *B25B 21/00* | (2006.01) |
| *B23P 19/06* | (2006.01) |
| *F16B 1/00* | (2006.01) |
| *B23P 11/02* | (2006.01) |

(52) U.S. Cl.
CPC ............ *F16B 39/106* (2013.01); *B23P 19/06* (2013.01); *B25B 21/002* (2013.01); *B23P 11/025* (2013.01); *F16B 1/0014* (2013.01); *F16B 2001/0078* (2013.01)

(58) Field of Classification Search
CPC .................. F16B 39/106; F16B 1/0014; F16B 2001/0078; B23P 19/06; B23P 11/025; B25B 21/002
See application file for complete search history.

(56) References Cited

U.S. PATENT DOCUMENTS

| 2,512,426 A | * | 6/1950 | Hartley ................. B23K 1/002 174/94 R |
| 3,661,040 A | * | 5/1972 | Lesner ................. B25B 23/145 81/468 |
| 5,366,331 A | * | 11/1994 | Erbes .................... F16B 1/0014 411/361 |
| 7,431,351 B2 | * | 10/2008 | Russell .................. F16L 15/08 285/334.1 |
| 8,901,765 B2 | * | 12/2014 | Chen ........................ H02J 7/14 290/50 |
| 10,012,416 B2 | * | 7/2018 | Kim ........................ F25B 9/004 |
| 2008/0209914 A1 | * | 9/2008 | De Wergifosse ......... F25B 9/04 62/5 |

FOREIGN PATENT DOCUMENTS

| KR | 1991-0008776 Y1 | 11/1991 |
| KR | 10-2006-0011029 A | 2/2006 |

* cited by examiner

*Primary Examiner* — Hadi Shakeri
(74) *Attorney, Agent, or Firm* — Morgan, Lewis & Bockius LLP (57) ABSTRACT

A nut runner apparatus for screw-coupling a nut to a bolt, according to an exemplary embodiment of the present invention, includes a nut socket into which the nut is removably inserted, a heating device that heats the nut to thermally expand the nut, an actuating device that rotates the nut socket to screw-couple the nut thermally expanded by the heating device to the bolt, and a cooling device that cools the nut screw-coupled to the bolt to thermally contract the nut.

6 Claims, 9 Drawing Sheets

NUT RUNNER

CROSS-REFERENCE(S) TO RELATED APPLICATIONS

The present application claims priority to Korean Patent Application No. 10-2017-0064861, filed on May 25, 2017, the entire contents of which is incorporated herein for all purposes by this reference.

BACKGROUND OF THE INVENTION

Field of the Invention

The present invention relates to a nut runner, and, more particularly, the present invention relates to a nut runner configured for screw-coupling a nut and a bolt.

Description of Related Art

In various industrial fields, a number of components are generally fastened together by screw-coupling bolts and nuts.

Since labor and time are required to fasten components together by screw-coupling bolts and nuts, nut runners configured for automatically screw-coupling bolts and nuts have been developed and used.

A nut runner in the related art includes a nut socket into which a nut, to be screw-coupled to a bolt, is inserted and an actuating device that rotates the nut socket to screw-couple the nut to the bolt. However, according to the nut runner in the related art, a gap may be formed between threads of the nut and threads of the bolt. Due to the given problem, the nut runner in the related art may cause a reduction in a normal force acting on the threads of the nut and the threads of the bolt, and thus a clamping force that the bolt and the nut apply to fasten components together may be decreased.

The information disclosed in this Background of the Invention section is only for enhancement of understanding of the general background of the invention and should not be taken as an acknowledgement or any form of suggestion that this information forms the prior already known to a person skilled in the art.

BRIEF SUMMARY

The present invention has been made to solve the above-mentioned problems occurring in the related art while advantages achieved by the related art are maintained intact.

Various aspects of the present invention are directed to providing a nut runner having an improved structure to prevent a gap from being formed between threads of a nut and threads of a bolt when the nut and the bolt are screw-coupled together.

The technical problems to be solved by the present invention are not limited to the aforementioned problems, and any other technical problems not mentioned herein will be clearly understood from the following description by those skilled in the art to which the present invention pertains.

According to various aspects of the present invention, a nut runner for screw-coupling a nut to a bolt may include a nut socket into which the nut is removably inserted, a heating device that heats the nut to thermally expand the nut, an actuating device that rotates the nut socket to screw-couple the nut thermally expanded by the heating device to the bolt, and a cooling device that cools the nut screw-coupled to the bolt to thermally contract the nut.

According to an exemplary embodiment of the present invention, the heating device may include a power supply that supplies power and an induction coil that heats the nut by electromagnetic induction using the power.

According to an exemplary embodiment of the present invention, the heating device may further include a brush electrically connecting the power supply and the induction coil, and the brush may have a first brush electrically connected to one of positive and negative electrodes of the power supply and a second brush electrically connected to the other electrode.

According to an exemplary embodiment of the present invention, at least a portion of the induction coil may be wound around the nut socket to rotate together with the nut socket, and the induction coil may include first and second portions that are provided at opposite end portions of the induction coil and are selectively located in contact with, or in non-contact with, the first and second brushes.

According to an exemplary embodiment of the present invention, the second portion may be positioned to make contact with one of the first and second brushes when the first portion makes contact with the other brush.

According to an exemplary embodiment of the present invention, the cooling device may include a vortex tube that separates compressed air into high-temperature air and low-temperature air to cool the nut by the low-temperature air.

According to an exemplary embodiment of the present invention, the cooling device may further include an air compressor that compresses air supplied externally and discharges the compressed air.

According to an exemplary embodiment of the present invention, the cooling device may further include a compressed-air line that connects the air compressor and the vortex tube and an opening or closing valve that opens or closes the compressed-air line.

According to an exemplary embodiment of the present invention, the vortex tube may be positioned to spray the low-temperature air toward the nut socket.

As set forth above, the nut runner according to exemplary embodiments can screw-couple a thermally expanded nut to a bolt and then cool the nut to allow the nut to make close contact with the bolt, increasing a normal force acting on the bolt and the nut and thus enhancing a clamping force that the bolt and the nut apply to fasten components together.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Terms, including "first", "second", "A", "B", "(a)", "(b)", and the like, may be used herein to describe elements of the present invention. Such terms are only used to distinguish one element from another element, and the substance, sequence, order, or number of these elements is not limited by these terms. Unless otherwise defined, all terms used herein, including technical and scientific terms, have the same meaning as those generally understood by those skilled in the art to which the present invention pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 1:
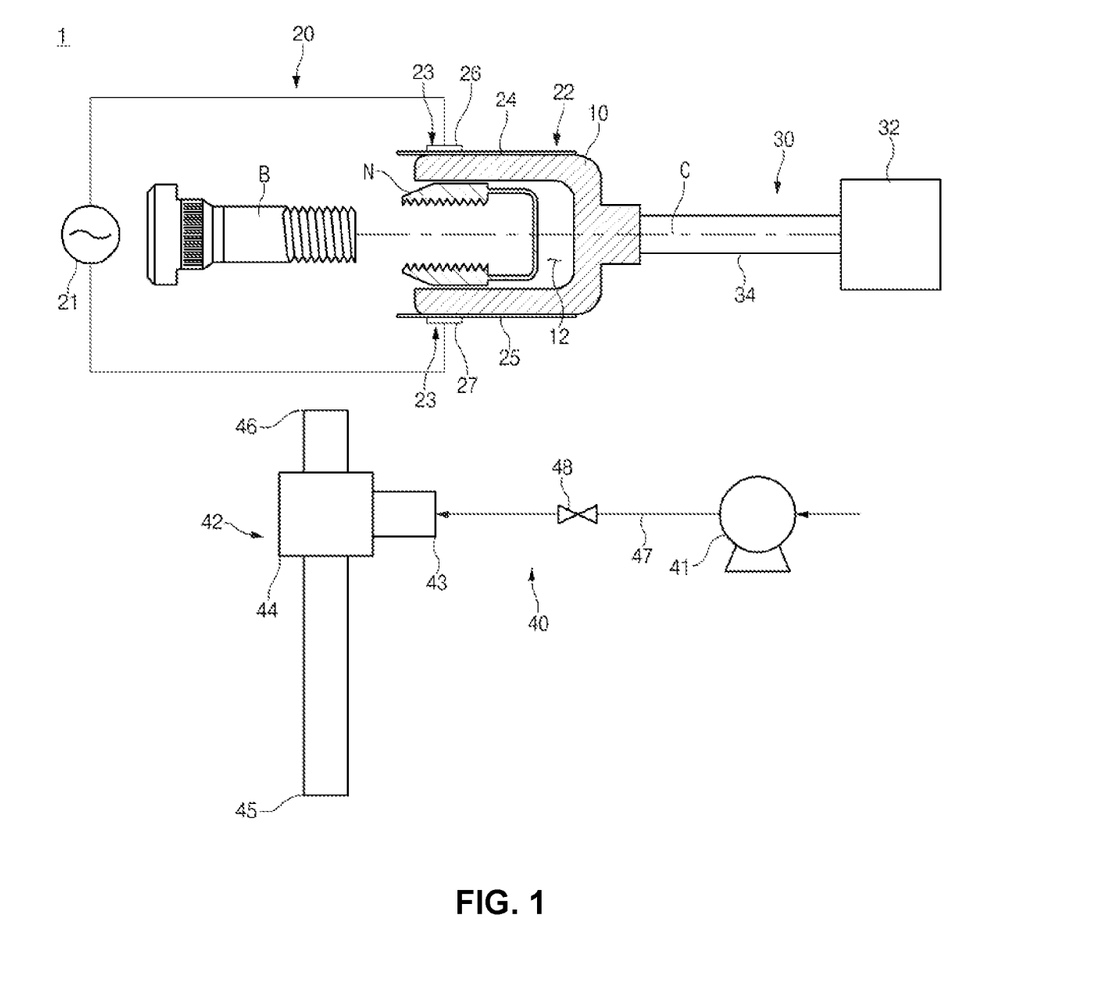
FIG. 1 is a partially sectioned view illustrating a schematic configuration of a nut runner according to an exemplary embodiment of the present invention.

FIG. 1 is a partially sectioned view illustrating a schematic configuration of a nut runner according to an exemplary embodiment of the present invention.

Referring to FIG. 1, a nut runner 1 according to an exemplary embodiment of the present invention may include a nut socket 10 into which a nut N is removably inserted, a heating device 20 that heats the nut N to thermally expand the nut N, an actuating device 30 that linearly moves and rotates the nut socket 10 to screw-couple the nut N thermally expanded by the heating device 20 to a bolt B, a cooling device 40 that cools the nut N screw-coupled to the bolt B to thermally contract the nut N, and the like.

The nut N, to be screw-coupled to the bolt B, may be removably inserted into the nut socket 10. For example, as illustrated in FIG. 1, the nut socket 10 may have an insertion recess 12 into which the nut N is removably inserted. The insertion recess 12 may have a shape corresponding to that of the nut N wherein the nut N is inserted into the insertion recess 12 or extracted from the insertion recess 12.

The nut socket 10 may be formed of a material having a coefficient of thermal expansion which is less than that of the nut N. Accordingly, the nut socket 10 may thermally expand or contract at a lower rate than the nut N when the nut N is heated by the heating device 20 or cooled by the cooling device 40.

The nut socket 10 and the nut N inserted into the nut socket 10 may be linearly moved along a central axis C of the nut socket 10, or may be rotated about the central axis C of the nut socket 10 by the actuating device 30, which will be described below.

Figure 2:
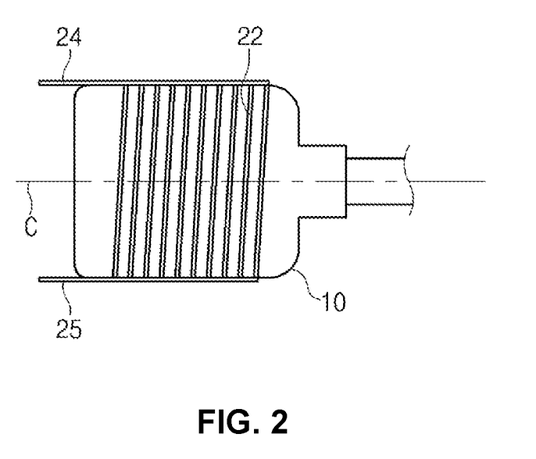
FIG. 2 illustrates an induction coil wound around a nut socket illustrated in FIG. 1.
Figure 3:
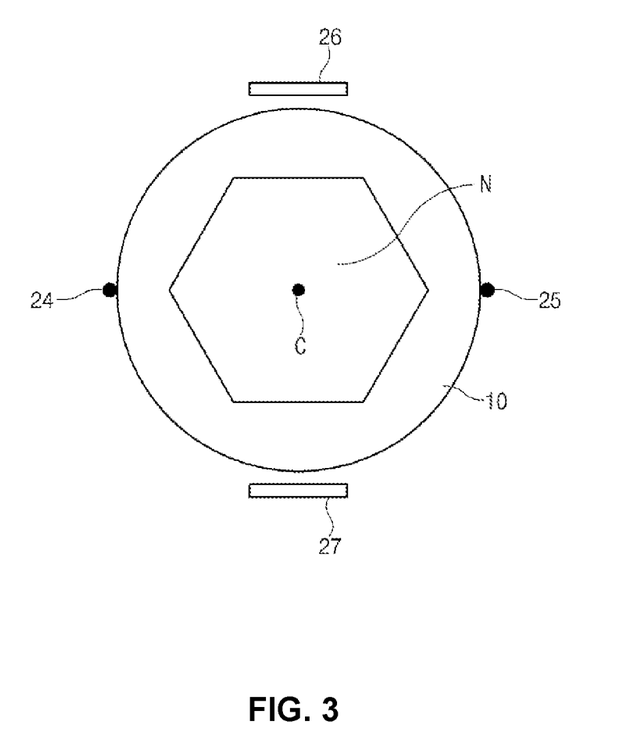
FIG. 3 illustrates the induction coil in non-contact with brushes illustrated in FIG. 1.

FIG. 2 illustrates an induction coil wound around the nut socket illustrated in FIG. 1, and FIG. 3 illustrates the induction coil in non-contact with brushes illustrated in FIG. 1.

Figure 4:
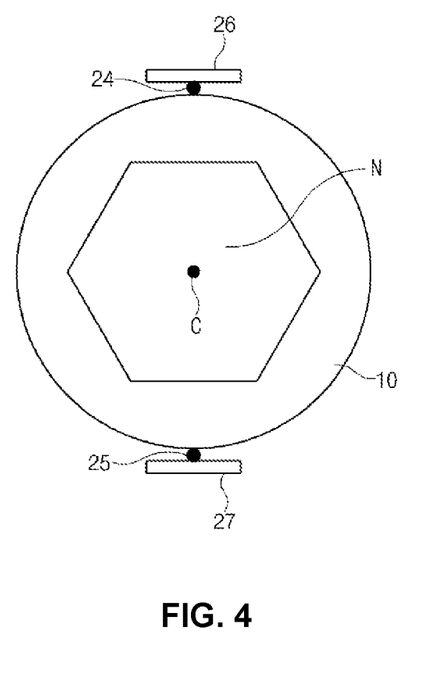
FIG. 4 illustrates a state in which first and second portions of the induction coil illustrated in FIG. 3 make contact with first and second brushes, respectively.
Figure 5:
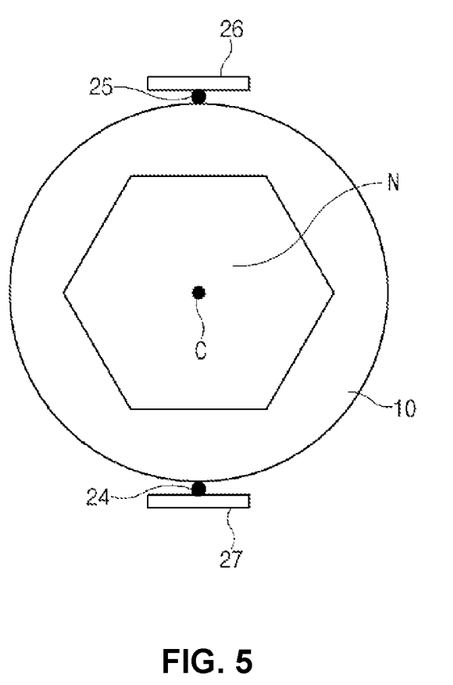
FIG. 5 illustrates a state in which the first and second portions of the induction coil illustrated in FIG. 3 make contact with the second and first brushes, respectively.

FIG. 4 illustrates a state in which first and second portions of the induction coil illustrated in FIG. 3 make contact with first and second brushes, respectively, and FIG. 5 illustrates a state in which the first and second portions of the induction coil illustrated in FIG. 3 make contact with the second and first brushes, respectively.

The heating device 20 may be configured to heat the nut N inserted into the nut socket 10 to thermally expand the nut N. For example, the heating device 20 may include a power supply 21 that supplies power, an induction coil 22 that heats the nut N by electromagnetic induction using the power supplied from the power supply 21, and brushes 23 that electrically connect the power supply 21 and the induction coil 22.

The power supply 21 may preferably be an AC power supply configured for supplying an alternating current, as illustrated in FIG. 1, but the power supply 21 is not limited thereto.

As illustrated in FIG. 2, at least a portion of the induction coil 22 may be wound around the external circumferential surface of the nut socket 10 to be linearly moved or rotated with the nut socket 10 by the actuating device 30.

The induction coil 22 may have a first portion 24 at one end portion thereof and a second portion 25 at an opposite end portion thereof. As illustrated in FIG. 1, the first and second portions 24 and 25 may extend along the central axis C of the nut socket 10. As illustrated in FIG. 3, the first and second portions 24 and 25 may be radially separated from each other by a predetermined angle with respect to the central axis C of the nut socket 10. The angle formed by the first and second portions 24 and 25 with respect to the central axis C of the nut socket 10 is not specifically limited. For example, as illustrated in FIG. 3, the first and second portions 24 and 25 may be radially separated from each other by 180 degrees with respect to the central axis C of the nut socket 10.

The brushes 23 may be configured to electrically connect the first and second portions 24 and 25 of the induction coil 22 with positive and negative electrodes of the power supply 21. For example, as illustrated in FIG. 1, the brushes 23 may include a first brush 26 electrically connected to one of the positive and negative electrodes of the power supply 21 and a second brush 27 electrically connected to the other electrode.

The first and second brushes 26 and 27 may be radially separated from each other by a predetermined angle with respect to the central axis C of the nut socket 10. For example, as illustrated in FIG. 3, the first and second brushes 26 and 27 may be radially separated from each other by 180 degrees (that is, the same angle as that between the first and second portions 24 and 24) with respect to the central axis C of the nut socket 10.

According to the configuration of the heating device 20 described above, the induction coil 22 may be alternately connected to and disconnected from the power supply 21 to heat the nut N by electromagnetic induction while rotating about the central axis C of the nut socket 10 by the actuating device 30.

For example, when the first and second portions 24 and 25 are in non-contact with the first and second brushes 26 and 27, as illustrated in FIG. 3, the induction coil 22 may be disconnected from the power supply 21, and induction heating of the nut N by the induction coil 22 may be stopped.

For example, when the first portion 24 makes contact with the first brush 26 and the second portion 25 makes contact with the second brush 27, as illustrated in FIG. 4, the induction coil 22 may be connected to the power supply 21 through the first and second brushes 26 and 27 to heat the nut N by electromagnetic induction using the power supplied from the power supply 21.

For example, when the first portion 24 makes contact with the second brush 27 and the second portion 25 makes contact with the first brush 26, as illustrated in FIG. 5, the induction coil 22 may be connected to the power supply 21 through the first and second brushes 26 and 27 to heat the nut N by electromagnetic induction using the power supplied from the power supply 21.

As described above, the induction coil 22 may be alternately connected to and disconnected from the power supply 21 through the brushes 23 to intermittently heat the nut N by electromagnetic induction. The connection relationship between the induction coil 22 and the power supply 21 may prevent the induction coil 22 from being twisted while being rotated by the actuating device 30 and may prevent the nut N from being heated to an excessive temperature by electromagnetic induction. Meanwhile, as the nut N inserted into the nut socket 10 is heated by electromagnetic induction using the induction coil 22, the nut N may thermally expand with a gradually increasing diameter.

Figure 6:
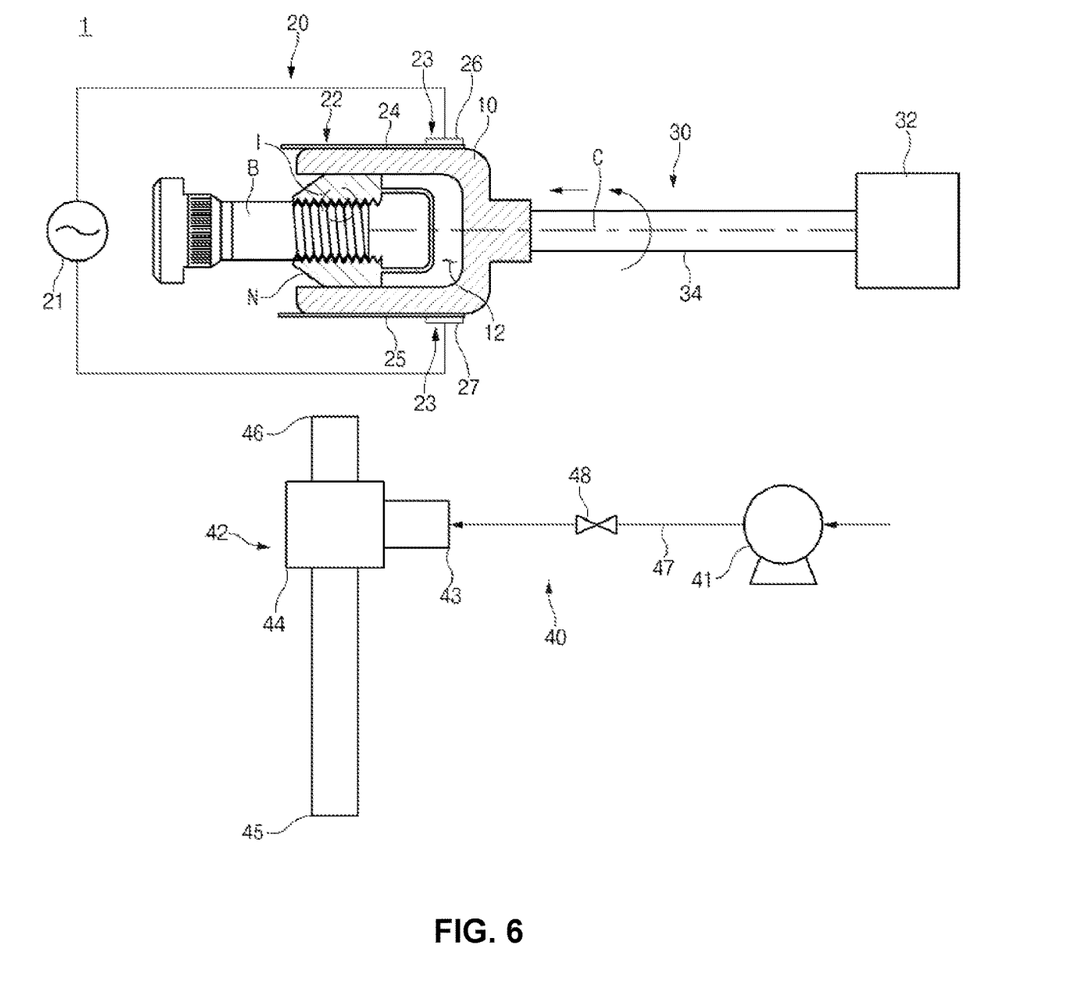
FIG. 6 is a partially sectioned view for explaining a method of temporarily coupling a nut and a bolt illustrated in FIG. 1.
Figure 7:
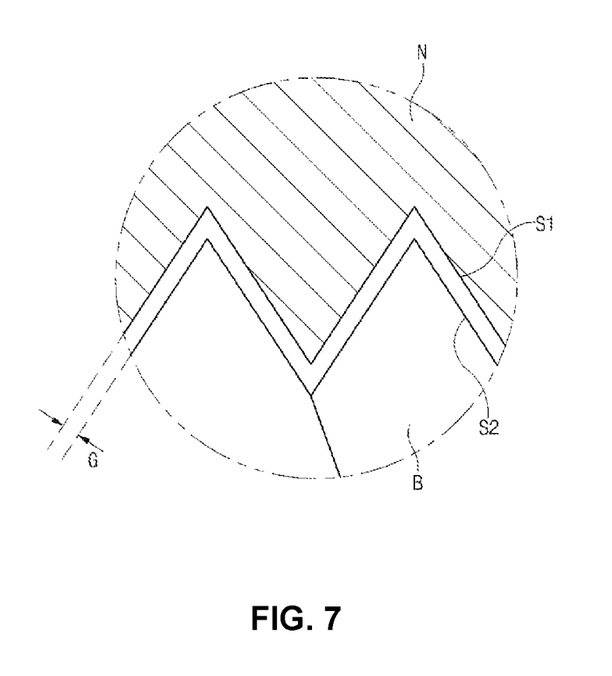
FIG. 7 is a partial enlarged view of a region I of FIG. 6.

FIG. 6 is a partially sectioned view for explaining a method of temporarily coupling the nut and the bolt illustrated in FIG. 1, and FIG. 7 is a partial enlarged view of a region I of FIG. 6.

The actuating device 30 may be configured to rotate or linearly move the nut socket 10 and the induction coil 22 wound around the nut socket 10. As illustrated in FIG. 6, the actuating device 30 may include a drive motor 32 that provides a rotational driving force and a spindle 34 disposed between the drive motor 32 and the nut socket 10 to convert a rotary motion of the drive motor 32 into a rotary motion and a translational motion and transmit the same to the nut socket 10 and the induction coil 22.

The drive motor 32 may include a universal motor configured for providing a rotational driving force.

The spindle 34 may have one end portion axially coupled with the drive motor 32 and an opposite end portion axially coupled with the nut socket 10. When the drive motor 32 rotates in a direction, the spindle 34 may extend while rotating in the direction, and when the drive motor 32 rotates in an opposite direction, the spindle 34 may retract while rotating in the opposite direction thereof. Since the configuration of the spindle 34 is the same as that of a generally-used spindle, a more specific description thereof will be omitted.

The actuating device 30 may allow the nut socket 10 and the induction coil 22 wound around the nut socket 10 to move toward the bolt B while rotating in a direction depending on the rotating direction of the drive motor 32, or to move away from the bolt B while rotating in the opposite direction thereof. Due to the present case, the induction coil 22 may be alternately connected to and disconnected from the power supply 21 while being rotated in a direction and moved toward the bolt B by the actuating device 30. Accordingly, the induction coil 22 may heat the nut N inserted into the nut socket 10 by electromagnetic induction using the power supplied from the power supply 21 to allow the nut N to thermally expand with an increasing diameter. Furthermore, as illustrated in FIG. 6, the nut socket 10 may screw-couple the nut N with the bolt B while being rotated in a direction and moved toward the bolt B by the actuating device 30. Referring to FIG. 7, since the nut N is screw-coupled with the bolt B in the state in which the diameter of the nut N has been increased by induction heating, a gap G may be formed between threads S2 of the bolt B and threads S1 of the nut N. Hereinafter, a state in which the bolt B and the nut N heated by electromagnetic induction are screw-coupled with each other wherein the gap G is formed between the threads S2 of the bolt B and the threads S1 of the nut N is referred to as a temporarily-coupled state of the bolt B and the nut N.

Figure 8:
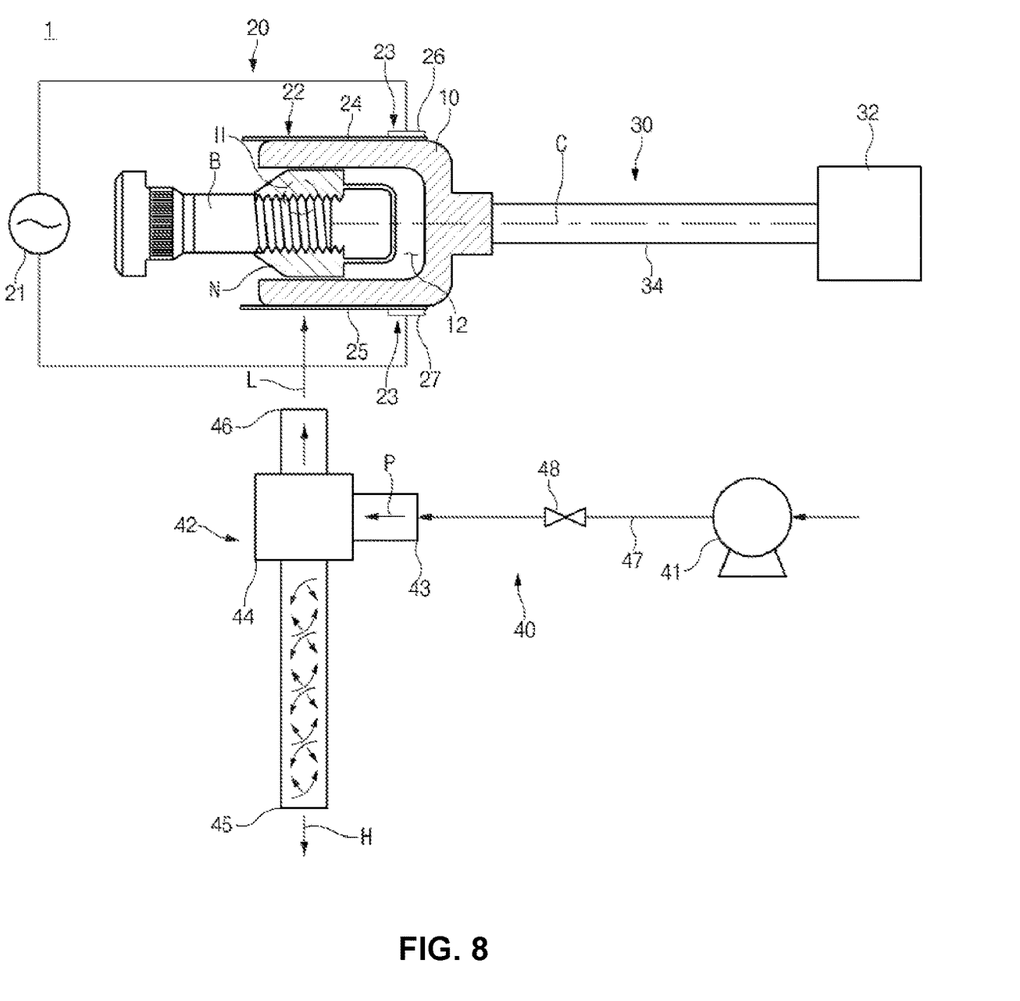
FIG. 8 is a partially sectioned view for explaining a method of completely coupling the nut and the bolt illustrated in FIG. 6.
Figure 9:
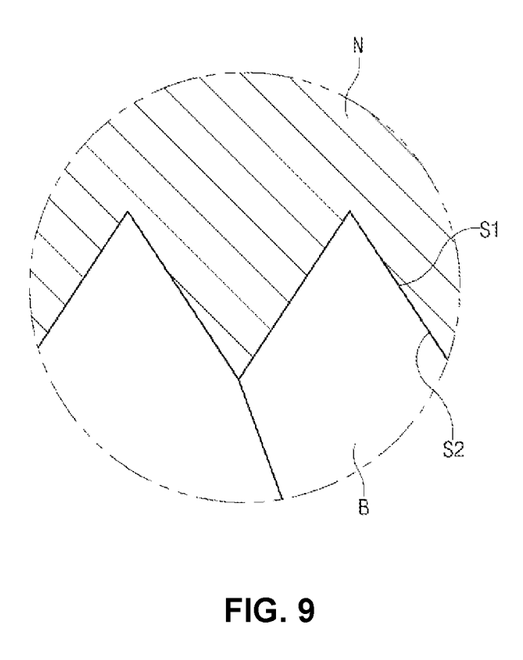
FIG. 9 is a partial enlarged view of a region II of FIG. 8.

FIG. 8 is a partially sectioned view for explaining a method of completely coupling the nut and the bolt illustrated in FIG. 6, and FIG. 9 is a partial enlarged view of a region II of FIG. 8.

The cooling device 40 may be configured to cool the nut N temporarily coupled with the bolt B to thermally contract the nut N. For example, the cooling device 40 may include an air compressor 41 that compresses air supplied externally and discharges the compressed air P, a vortex tube 42 that separates the compressed air P supplied from the air compressor 41 into high-temperature air H and low-temperature air L, and cools the nut N by the low-temperature air L, and the like.

The air compressor 41 may suction air in the atmosphere, compress the suctioned air to a predetermined pressure, and then discharge the compressed air P.

The vortex tube 42 may be configured to thermally separate the compressed air P into the high-temperature air H and the low-temperature air L by converting kinetic energy of the compressed air P into thermal energy. The vortex tube 42 may include a typical vortex tube configured for separating fluid into high-temperature fluid and low-temperature fluid by converting kinetic energy of the fluid into thermal energy. For example, the vortex tube 42 may include a compressed-air inlet 43 into which the compressed air P is introduced, a vortex swirl chamber 44 that thermally separates the compressed air P into the high-temperature air H and the low-temperature air L, a high-temperature air outlet 45 through which the high-temperature air H is discharged, and a low-temperature air outlet 46 through which the low-temperature air L is discharged.

The compressed-air inlet 43 may be connected to the air compressor 41 by a compressed-air line 47. An opening/closing valve 48 configured for opening or closing the compressed-air line 47 may be disposed in the compressed-air line 47. Accordingly, when the compressed-air line 47 is opened by the opening/closing valve 48, the compressed air P compressed in the air compressor 41 may be introduced into the compressed-air inlet 43.

The vortex swirl chamber 44 may thermally separate the compressed air P into the high-temperature air H and the low-temperature air L by converting kinetic energy of the compressed air P into thermal energy. The high-temperature air H thermally separated by the vortex tube 42 may be discharged through the high-temperature air outlet 45, and the low-temperature air L thermally separated by the vortex tube 42 may be discharged through the low-temperature air outlet 46.

As illustrated in FIG. 8, the vortex tube 42 may be positioned to spray the low-temperature air L, which is discharged through the low-temperature air outlet 46, toward the nut socket 10. Due to the provided configuration, the nut N inserted into the nut socket 10 may be directly cooled by the low-temperature air L, or may be indirectly cooled by the nut socket 10 cooled by the low-temperature air L, to thermally contract with a decreasing diameter. Accordingly, as illustrated in FIG. 9, the threads S2 of the bolt B and the threads S1 of the nut N may be brought into close contact with each other, and thus the bolt B and the nut N may be completely coupled together.

As described above, the nut runner 1 may screw-couple the nut N and the bolt B wherein no gap G is formed between the threads S2 of the bolt B and the threads S1 of the nut N. As a result, the nut runner 1 may increase the normal force acting on the threads S1 of the nut N and the threads S2 of the bolt B to enhance a clamping force that the bolt B and the nut N apply to fasten components together.

Figure 10:
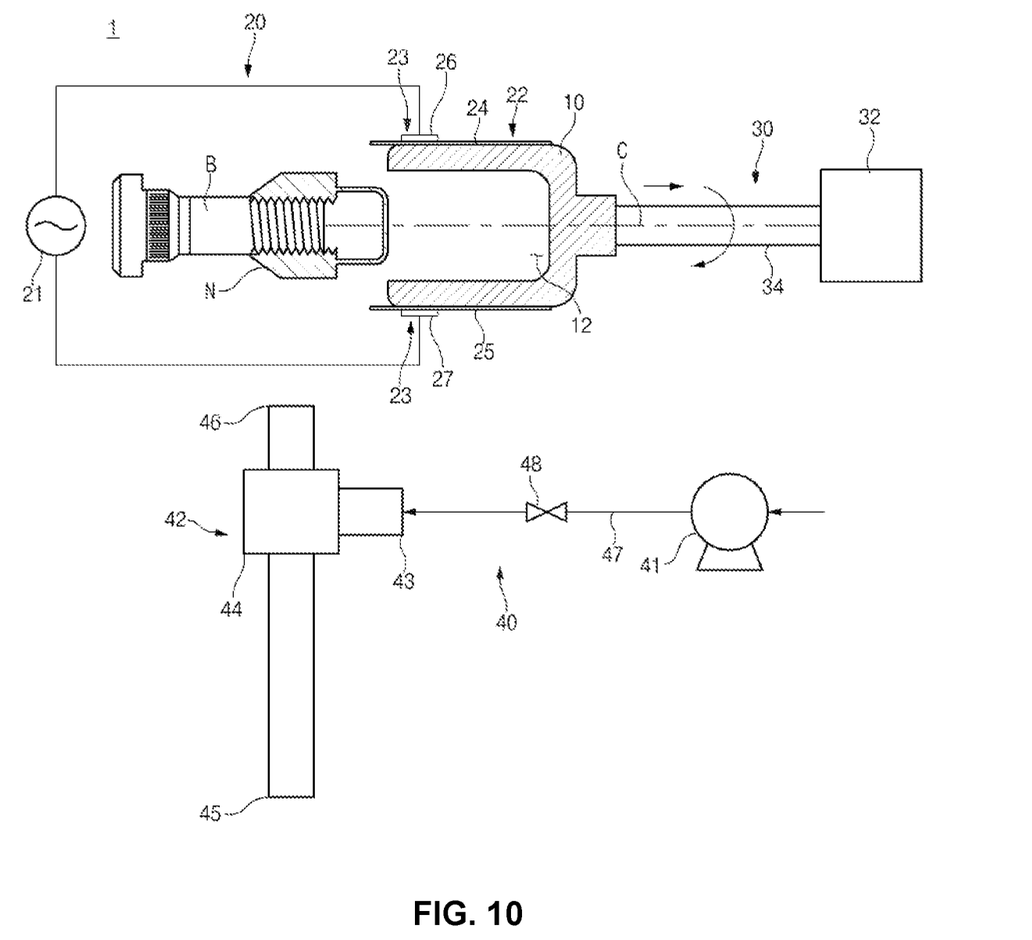
FIG. 10 is a partially sectioned view for explaining a method of separating the nut socket illustrated in FIG. 8 from the nut.

FIG. 10 is a partially sectioned view for explaining a method of separating the nut socket illustrated in FIG. 8 from the nut.

First, as illustrated in FIG. 1, the nut N to be screw-coupled to the bolt B may be inserted into the insertion recess 12 of the nut socket 10. At the present time, the power supply 21 may preferably be shut down to prevent power from being supplied to the induction coil 22.

Next, as illustrated in FIG. 6, the power supply 21 may operate to supply power to the induction coil 22 at the same time that the actuating device 30 operates to move the nut socket 10 and the induction coil 22 toward the bolt B while rotating the same in a direction thereof. As such, the nut N, thermally expanded by electromagnetic induction using the induction coil 22, may be screw-coupled to the bolt B.

Thereafter, as illustrated in FIG. 8, the compressed-air line 47 may be opened by use of the opening/closing valve 48 at the same time that the air compressor 41 operates. At the present time, the power supply 21 may preferably be shut down to prevent power from being supplied to the induction coil 22. As such, air in the atmosphere may be compressed by the air compressor 41 and thermally separated into high-temperature air H and low-temperature air L by the vortex tube 42, and the nut N may be thermally contracted by the low-temperature air L discharged from the vortex tube 42, and may thus be brought into close contact with the bolt B. Since the nut socket 10 has a coefficient of thermal expansion less than that of the nut N, a gap may be formed between the external circumferential surface of the nut N and the internal circumferential surface of the insertion recess 12 as the nut N thermally contracts.

Furthermore, as illustrated in FIG. 10, the actuating device 30 may operate to move the nut socket 10 and the induction coil 22 away from the bolt B while rotating the same in an opposite direction, and the power supply 21 may be simultaneously shut down to prevent power from being supplied to the induction coil 22. As such, the nut socket 10 may be moved away from the bolt B and may be separated from the nut N. Since the external circumferential surface of the nut N and the internal circumferential surface of the insertion recess 12 are separated from each other when the nut N is cooled by the low-temperature air L, the nut N may not move together with the nut socket 10 when the nut socket 10 moves backward thereof.

For convenience in explanation and accurate definition in the appended claims, the terms "upper", "lower", "up", "down", "upwards", "downwards", "internal", "outer", "inside", "outside", "inwardly", "outwardly", "internal", "external", "front", "rear", "back", "forwards", and "backwards" are used to describe features of the exemplary embodiments with reference to the positions of such features as displayed in the figures.

The foregoing description of specific exemplary embodiments of the present invention has been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A nut runner apparatus for screw-coupling a nut to a bolt, the nut runner apparatus comprising:
   a nut socket into which the nut is configured to be removably inserted;
   a heating device configured to heat the nut to thermally expand the nut;
   an actuating device configured to rotate the nut socket to screw-couple the nut thermally expanded by the heating device, to the bolt; and
   a cooling device configured to cool the nut screw-coupled to the bolt to thermally contract the nut,
   wherein the heating device includes a power supply configured to supply power, an induction coil configured to heat the nut by electromagnetic induction using the power and a brush configured to electrically connect the power supply and the induction coil,
   wherein the brush has a first brush electrically connected to one of positive and negative electrodes of the power supply and a second brush electrically connected to the other of the positive and negative electrodes,
   wherein at least a portion of the induction coil is wound around the nut socket to rotate with the nut socket, and
   wherein the induction coil includes first and second portions provided at opposite end portions of the induction coil, the first and second portions being selectively disposed in contact with, or in non-contact with, the first and second brushes.

2. The nut runner apparatus of claim 1, wherein the second portion is disposed to contact with one of the first and second brushes when the first portion makes contact with the other of the first and second brushes.

3. The nut runner apparatus of claim 1, wherein the cooling device includes a vortex tube configured to separate compressed air into high-temperature air and low-temperature air to cool the nut by the low-temperature air.

4. The nut runner apparatus of claim 3, wherein the cooling device further includes an air compressor configured to compress air supplied externally and discharge the compressed air.

5. The nut runner apparatus of claim 4, wherein the cooling device further includes a compressed-air line connecting the air compressor and the vortex tube and an opening/closing valve configured to open or close the compressed-air line.

6. The nut runner apparatus of claim 3, wherein the vortex tube is disposed to spray the low-temperature air toward the nut socket.

* * * * *